(12) United States Patent
Watanabe (10) Patent No.: US 8,253,919 B2
(45) Date of Patent: Aug. 28, 2012

(54) METHOD AND APPARATUS FOR FABRICATING LIQUID CRYSTAL DISPLAY DEVICE AND SUBSTRATE BASE MATERIAL FOR LIQUID CRYSTAL DISPLAY DEVICE

(75) Inventor: Noriko Watanabe, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 135 days.

(21) Appl. No.: 12/203,156

(22) Filed: Sep. 3, 2008

(65) Prior Publication Data

US 2009/0004407 A1 Jan. 1, 2009

Related U.S. Application Data

(63) Continuation of application No. 11/189,612, filed on Jul. 26, 2005, now Pat. No. 7,466,391.

(30) Foreign Application Priority Data

Jul. 28, 2004 (JP) ................. 2004-220109

(51) Int. Cl.
*G02F 1/1333* (2006.01)
*G02F 1/1339* (2006.01)
*G02F 1/1341* (2006.01)
*B65B 31/00* (2006.01)
*B67C 3/00* (2006.01)
*C09K 19/00* (2006.01)
*H01J 9/38* (2006.01)

(52) U.S. Cl. ............ 349/189; 349/86; 349/92; 349/153; 349/154; 349/158; 349/190; 141/8; 428/1.1; 445/70

(58) Field of Classification Search .................. 349/86, 349/92, 189, 190, 153, 154, 158; 428/1.1; 445/70; 141/8
See application file for complete search history.

(56) References Cited

U.S. PATENT DOCUMENTS

| | | | |
|---|---|---|---|
| 2002/0018173 A1* | 2/2002 | Furukawa et al. | 349/187 |
| 2003/0147038 A1* | 8/2003 | Lee et al. | 349/187 |
| 2004/0100609 A1* | 5/2004 | Choo et al. | 349/187 |
| 2004/0164757 A1* | 8/2004 | Kimura et al. | 324/754 |
| 2005/0143513 A1* | 6/2005 | Kitamura | 524/492 |

OTHER PUBLICATIONS

Watanabe; "Method and Apparatus for Fabricating Liquid Crystal Display Device and Substrate Base Material for Liquid Crystal Display Device"; U.S. Appl. No. 11/189,612, filed Jul. 26, 2005.

* cited by examiner

*Primary Examiner* — Jerry Blevins
(74) *Attorney, Agent, or Firm* — Keating & Bennett, LLP (57) ABSTRACT

A plurality of liquid crystal cells are formed by encapsulating pieces of liquid crystal material with in a plurality of first sealing members, respectively, between a pair of flexible substrate base materials. Only respective parts of the pair of substrate base materials are contained inside a vacuum container, and the liquid crystal cells are formed inside the vacuum container reduced in pressure.

7 Claims, 10 Drawing Sheets

METHOD AND APPARATUS FOR FABRICATING LIQUID CRYSTAL DISPLAY DEVICE AND SUBSTRATE BASE MATERIAL FOR LIQUID CRYSTAL DISPLAY DEVICE

CROSS-REFERENCE TO RELATED APPLICATIONS

This application claims priority under 35 U.S.C. §119 on Patent Application No. 2004-220109 filed in Japan on Jul. 28, 2004, the entire contents of which are hereby incorporated by reference.

BACKGROUND OF THE INVENTION (1) Field of the Invention

The present invention relates to a method and apparatus for fabricating a flexible liquid crystal display device and a substrate base material for the flexible liquid crystal display device.

(2) Description of Related Art

Liquid crystal display devices each have a liquid crystal layer sandwiched between a pair of substrates. Typically, a pair of glass substrates are used as the pair of substrates. Methods for fabricating a liquid crystal display device include the following known methods: a method in which liquid crystal material is dropped onto one of the pair of glass substrates and then the glass substrates is bonded to the other glass substrate; and a method in which the pair of glass substrates are previously bonded to each other and then liquid crystal material is vacuum-injected into cells formed between the pair of glass substrates. Both the methods need be carried out inside a vacuum container.

By the way, it has been known that when, instead of the glass substrates, flexible plastic substrates are used for liquid crystal display devices, images are displayed with the whole liquid crystal display devices curved significantly. Applications of the liquid crystal display devices include electronic paper and wearable displays, such as watches.

When a plurality of liquid crystal display devices with a pair of plastic substrates are fabricated, they are preferably fabricated spatially continuously from a pair of rolled or long-sheet-like plastic substrate base materials in terms of the improvement of production efficiency.

However, it is difficult to contain the whole plastic substrate base materials inside the vacuum container, because the plastic substrate base materials inevitably become relatively large. Furthermore, the production cost increases, because the vacuum container itself must be made larger.

To cope with this, it has conventionally been known that each base material is sectioned into liquid crystal cells by a double-seal structure, all adjacent pairs of the liquid crystal cells are allowed to communicate with each other through a connection path, and liquid crystal material is not injected into the liquid crystal cells inside a vacuum container (see, for example, Japanese Unexamined Patent Publication No. 62-150283).

More particularly, seals are provided on the top surfaces of the plastic substrates to surround the liquid crystal cells, respectively, and then the plastic substrates are bonded to each other by a pressure roller. A little larger amount of the liquid crystal material than a necessary amount thereof is dropped onto the liquid crystal cells at the position at which the plastic substrates are bonded to each other. In this way, air bubbles in the liquid crystal material are expelled through the connection path.

SUMMARY OF THE INVENTION

However, it is extremely difficult to completely remove air bubbles from the liquid crystal cells by the known method, because liquid crystal display devices are not actually fabricated inside the vacuum container.

The present invention has been made in view of the above-described problem, and its object is to provide a flexible liquid crystal display device that can be fabricated spatially continuously without using a large vacuum container and certainly remove air bubbles from liquid crystal cells.

In order to achieve the above-described object, the present invention is configured to contain only respective parts of a pair of substrate base materials in a vacuum container and form liquid crystal cells inside the vacuum container.

To be specific, in a method for fabricating a liquid crystal display device of the present invention in which a plurality of liquid crystal cells are formed by encapsulating pieces of liquid crystal material within a plurality of first sealing members, respectively, between a pair of flexible substrate base materials and then separated from one another, only respective parts of the pair of substrate base materials are contained inside a vacuum container, and the liquid crystal cells are formed inside the vacuum container reduced in pressure.

The method of the present invention preferably comprises: a first sealing member formation step of setting, on one of the pair of substrate base materials, a plurality of liquid crystal cell formation regions in which the liquid crystal cells are formed at predetermined intervals and forming the plurality of first sealing members in each said liquid crystal cell formation region, each said plurality of first sealing member being of closed configuration; a liquid crystal supplying step of supplying the liquid crystal material into recesses defined by the respective inner perimetrical surfaces of the first sealing members and the adjacent surface of the one of the substrate base materials; a containment step of containing at least one of the liquid crystal cell formation regions inside the vacuum container; and a bonding step of bonding the pair of substrate base materials to each other by reducing the vacuum container in pressure.

The method of the present invention may comprise: a first sealing member formation step of setting, on one of the pair of substrate base materials, a plurality of liquid crystal cell formation regions in which the liquid crystal cells are formed at predetermined intervals and forming the plurality of first sealing members in each said liquid crystal cell formation region; a bonding step of bonding the pair of substrate base materials to each other; and a filling step of filling, with liquid crystal material, a plurality of cells located in the vacuum container and defined by the plurality of first sealing members and the pair of substrate base materials.

It is preferable that the method of the present invention further comprises: a second sealing member formation step of forming, outside each said liquid crystal cell formation region, a second sealing member interposed between the pair of substrate base materials, wherein in the containment step, the vacuum container is sealed with the second sealing member.

In the bonding step, one of the pair of substrate base materials may be cut between the second sealing member and each said liquid crystal cell formation region, and then the vacuum container may be reduced in pressure.

The second sealing member may be formed into a line to separate adjacent two of the liquid crystal cell formation regions from each other.

The second sealing member may be formed into a closed configuration to surround each said liquid crystal cell formation region.

The second sealing member may be composed of an elastic material.

The vacuum container may be composed of a stage on which the pair of substrate base materials are placed and a vacuum chamber that covers the stage.

The cells may each have a fill opening through which the cells are filled with liquid crystal material, and each said fill opening may be enclosed from one side with a third sealing member.

It is preferable that in the bonding step, the vacuum container is reduced in pressure and thereby the pair of substrate base materials are held by the pair of holder plates while being sandwiched therebetween and, in the filling step, the cells are filled with liquid crystal material through communication holes allowing the cells to communicate with the vacuum container, said communication holes being formed in one of the holder plates.

An apparatus for fabricating a liquid crystal display device of the present invention in which a plurality of liquid crystal cells are formed by encapsulating pieces of liquid crystal material within a plurality of first sealing members, respectively, between a pair of flexible substrate base materials and then separated from one another, comprises: a vacuum container for containing only respective parts of the pair of substrate base materials; and a pressure reducer for reducing the vacuum container in pressure, said liquid crystal cells being formed inside the vacuum container reduced in pressure by the pressure reducer.

It is preferable that the apparatus of the present invention further comprises: a first sealing member formation unit for setting, on one of the pair of substrate base materials, a plurality of liquid crystal cell formation regions in which the liquid crystal cells are formed at predetermined intervals and forming the plurality of first sealing members in each said liquid crystal cell formation region, each said plurality of first sealing member being of closed configuration; a liquid crystal supply unit for supplying the liquid crystal material into recesses defined by the respective inner perimetrical surfaces of the first sealing members and the adjacent surface of the one of the substrate base materials; and a bonding unit for bonding the pair of substrate base materials to each other by reducing the vacuum container in pressure, wherein the vacuum container is configured to contain at least one of the liquid crystal cell formation regions.

The apparatus of the present invention may further comprise: a first sealing member formation unit for setting, on one of the pair of substrate base materials, a plurality of liquid crystal cell formation regions in which the liquid crystal cells are formed at predetermined intervals and forming the plurality of first sealing members in each said liquid crystal cell formation region; a bonding unit for bonding the pair of substrate base materials to each other by reducing the vacuum container in pressure; and a filler for filling, with liquid crystal material, a plurality of cells defined by the pair of substrate base materials and the plurality of first sealing members, said pair of substrate base materials being bonded to each other inside the vacuum container, wherein the vacuum container may be configured to contain at least one of the liquid crystal cell formation regions.

The vacuum container may be composed of a stage on which the pair of substrate base materials are placed and a vacuum chamber that covers the stage.

It is preferable that the cells each have a fill opening through which the cells are filled with liquid crystal material and each said fill opening may be enclosed from one side with a third sealing member.

The apparatus of the present invention may further comprise a pair of holder plates for holding the pair of substrate base materials by reducing the vacuum container in pressure, wherein communication holes may be formed in one of the holder plates to allow the cells to communicate with the vacuum container, and the cells may be filled with liquid crystal material through the communication holes.

A substrate base material for a liquid crystal display device of the present invention has a plurality of liquid crystal cell formation regions in each of which a plurality of liquid crystal cells are formed, said plurality of liquid crystal cell formation regions being arranged at predetermined intervals.

Effects

Next, effects of the present invention will be described.

When a liquid crystal display device is fabricated, only respective parts of a pair of flexible substrate base materials are contained inside a vacuum container. Subsequently, liquid crystal material is encapsulated by first sealing members between the respective parts of the pair of substrate base materials contained in the vacuum container reduced in pressure to form liquid crystal cells. Thereafter, the liquid crystal cells are separated from one another, thereby fabricating a liquid crystal display device.

Fabrication methods for a liquid crystal display device according to the present invention include: a method of a first aspect in which liquid crystal material is supplied between the pair of substrate base materials before the pair of substrate base materials are bonded to each other; and a method of a second aspect in which space between the pair of substrate base materials is filled with liquid crystal material after the pair of substrate base materials are bonded to each other.

The method of the first aspect comprises a first sealing member formation step, a liquid crystal supplying step, a containment step, and a bonding step. In the first sealing member formation step, a plurality of liquid crystal cell formation regions are set at predetermined intervals on one of the pair of substrate base materials, and a plurality of first sealing members of closed configuration are formed in each liquid crystal cell formation region. Thereafter, in the liquid crystal supplying step, liquid crystal material is supplied into recesses defined by the respective inner perimetrical surfaces of the first sealing members and the adjacent surface of the one of the pair of substrate base materials. Subsequently, in the containment step, at least one of the liquid crystal cell formation regions is contained inside a vacuum container. In this way, only respective parts of the pair of substrate base materials are contained in the vacuum container. Thereafter, in the bonding step, air bubbles are removed from the recesses by reducing the vacuum container in pressure, thereby bonding the pair of substrate base materials to each other.

The method of the second aspect comprises a first sealing member formation step, a containment step, a bonding step, and a filling step. In the first sealing member formation step, a plurality of liquid crystal cell formation regions are set on one of the pair of substrate base materials at predetermined intervals, and a plurality of sealing members are formed in each liquid crystal cell formation region. Thereafter, in the containment step, at least one of the liquid crystal cell formation regions is contained inside a vacuum container. In this way, only respective parts of the pair of substrate base materials are contained inside the vacuum container. Thereafter, in the bonding step, the pair of substrate base materials are bonded to each other by reducing the vacuum container in pressure. Subsequently, in the filling step, a plurality of cells defined by the plurality of first sealing members in the vacuum container and the respective parts of the pair of substrate base materials are filled with liquid crystal material. In this way, a vacuum can be produced by reducing the cells in pressure. Therefore, air bubbles can be removed from the liquid crystal cells.

Furthermore, a second sealing member is formed outside each liquid crystal cell formation region. Therefore, the vacuum container can be sealed with the second sealing member.

Moreover, the cells each have a fill opening through which the cells are filled with liquid crystal material, and the fill opening is enclosed from one side with a third sealing member. This can prevent excess part of the liquid crystal material from leaking out when the cells are filled with the liquid crystal material.

DETAILED DESCRIPTION OF THE INVENTION

Embodiments of the present invention will be described hereinafter in detail with reference to the drawings. The present invention is not limited to the following embodiments.

Embodiment 1

FIGS. 1 through 6 show embodiments of a method and apparatus for fabricating a liquid crystal display device and a substrate base material for the liquid crystal display device according to the present invention.

Figure 1:
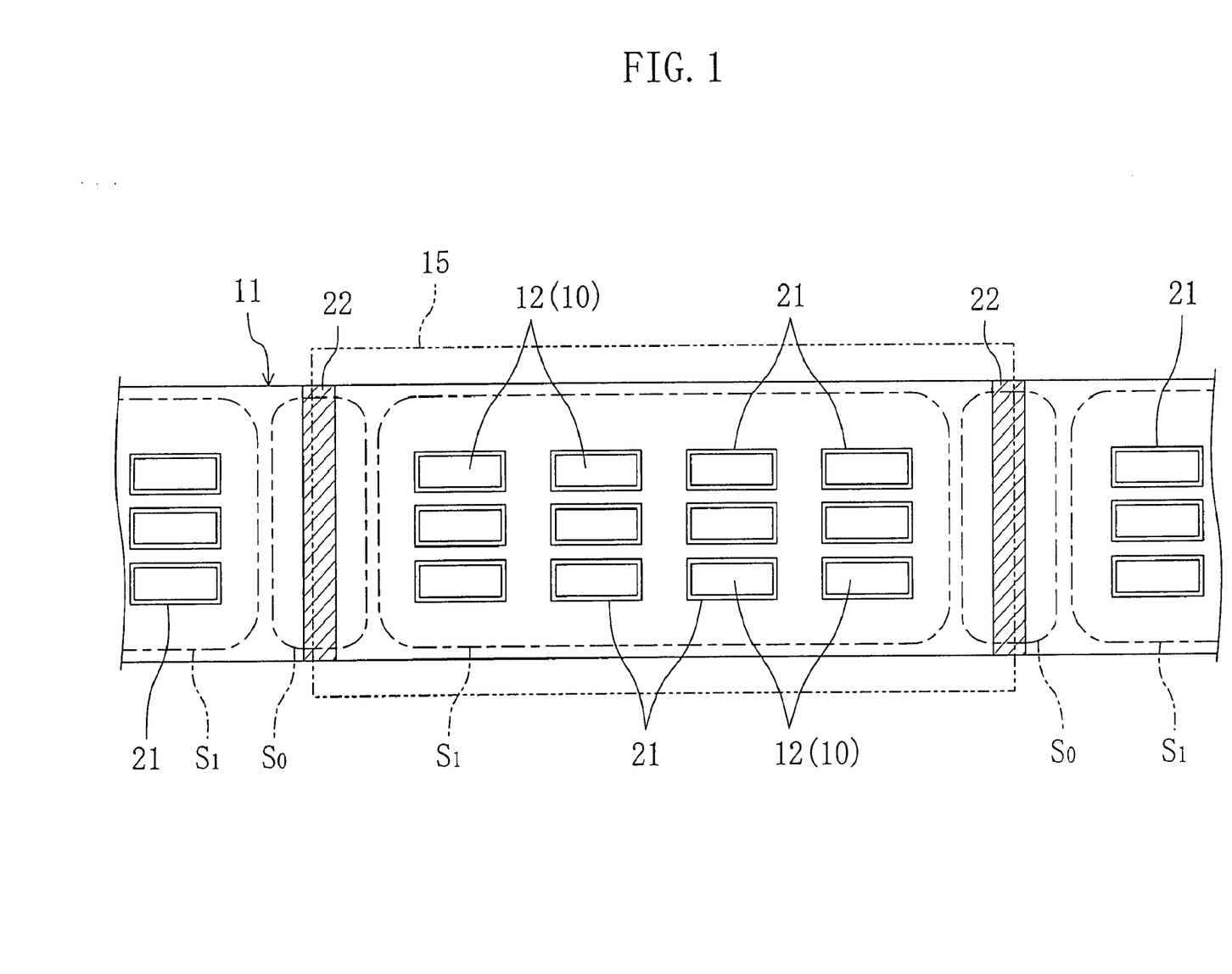
FIG. 1 is a plan view showing the lower one of a pair of substrate base materials of a first embodiment.

FIG. 1 is a plan view showing the lower one of a pair of substrate base materials 11 of the liquid crystal display device. A liquid crystal display device comprises liquid crystal cells 12 composed of a thin-film transistor (hereinafter, referred to as TFT) substrate formed with a plurality of switching elements, such as TFTs, an opposed substrate formed with a color filter or other elements, and a liquid crystal layer interposed between the TFT substrate and the opposed substrate. The structure of each substrate is not restrictive. The TFT substrate may be formed with a color filter.

The liquid crystal display device is fabricated from a pair of substrate base materials 11. More particularly, one of the pair of substrate base materials 11 is an aggregation of TFT substrates, and the other of the pair of substrate base materials 11 is an aggregation of opposed substrates. In this embodiment, each substrate base material 11 is composed of a flexible film, such as plastic.

A plurality of liquid crystal cells 12 are formed between the pair of substrate base materials 11 by encapsulating liquid crystal material in regions surrounded by first sealing members 21 of closed configuration, and then separated from one another, thereby fabricating a liquid crystal display device.

Alignment layers (not shown) are formed on the respective opposed surfaces of the pair of substrate base materials 11, respectively, and have been subjected to alignment using rubbing and then cleaned. Rubbing and cleaning are not required for some of liquid-crystal modes.

A plurality of liquid crystal cell formation regions $S_1$ in which liquid crystal cells are formed are set on the lower one of the pair of substrate base materials 11 at predetermined intervals. In other words, a strip-like marginal region $S_0$ is formed between adjacent two of the liquid crystal cell formation regions $S_1$. In each liquid crystal cell formation region $S_1$, the liquid crystal cells 12 are arranged in a matrix array. The liquid crystal cell formation region $S_1$ is formed such that its size corresponds to the size of a vacuum container 15.

The first sealing members 21 are sandwiched between the pair of substrate base materials 11 and formed to have a rectangular closed shape. Each liquid crystal cell formation region $S_1$ includes a plurality of cells 10 defined by the respective inner perimetrical surfaces of the first sealing members 21 and the respective opposed surfaces of the pair of substrate base materials 11, and each cell 10 is filled with liquid crystal material. In other words, each liquid crystal cell 12 is composed of the cell 10 and liquid crystal material with which the inside of the cell 10 is filled.

Meanwhile, second sealing members 22 are provided individually in regions between all adjacent pairs of the liquid crystal cell formation regions $S_1$ (i.e., the marginal regions $S_0$). Each of the second sealing members 22 is formed to extend linearly and orthogonally to the longitudinal direction of the substrate base materials 11 and sandwiched between the pair of substrate base materials 11, thereby separating one adjacent pair of the liquid crystal cell formation regions $S_1$ from each other.

Each of the liquid crystal cell formation regions $S_1$ interposed between adjacent pairs of the second sealing members 22 is contained in the vacuum container 15 separately when the liquid crystal cells 12 are formed in the liquid crystal cell formation region $S_1$.

—Fabrication Method for Liquid Crystal Display Device—

Next, a fabrication method for a liquid crystal display device of this embodiment will be described in detail. The fabrication method for a liquid crystal display device according to the present invention is characterized by containing not the whole of a pair of substrate base materials 11 but only respective parts of the pair of substrate base materials 11 inside a vacuum container 15 and forming liquid crystal cells 12 inside the vacuum container 15 reduced in pressure. More particularly, the fabricating method for a liquid crystal display device of this embodiment comprises a first sealing member formation step, a second sealing member formation step, a liquid crystal supplying step, an alignment step, a curing step, a containment step, and a bonding step, and after the supply of liquid crystal material into the cells 10, the pair of substrate base materials 11 are bonded to each other.

The fabrication method is carried out using a fabrication apparatus for a liquid crystal display device. The fabrication apparatus comprises a vacuum container 15, pressure reducers 51, such as vacuum pumps or the like, a first sealing member formation unit 52, a second sealing member formation unit 53, a liquid crystal supply unit 54, curing units 55, and a bonding unit 56, and is configured to form the liquid crystal cells 12 inside the vacuum container 15 reduced in pressure by the pressure reducers 51.

Figure 2:
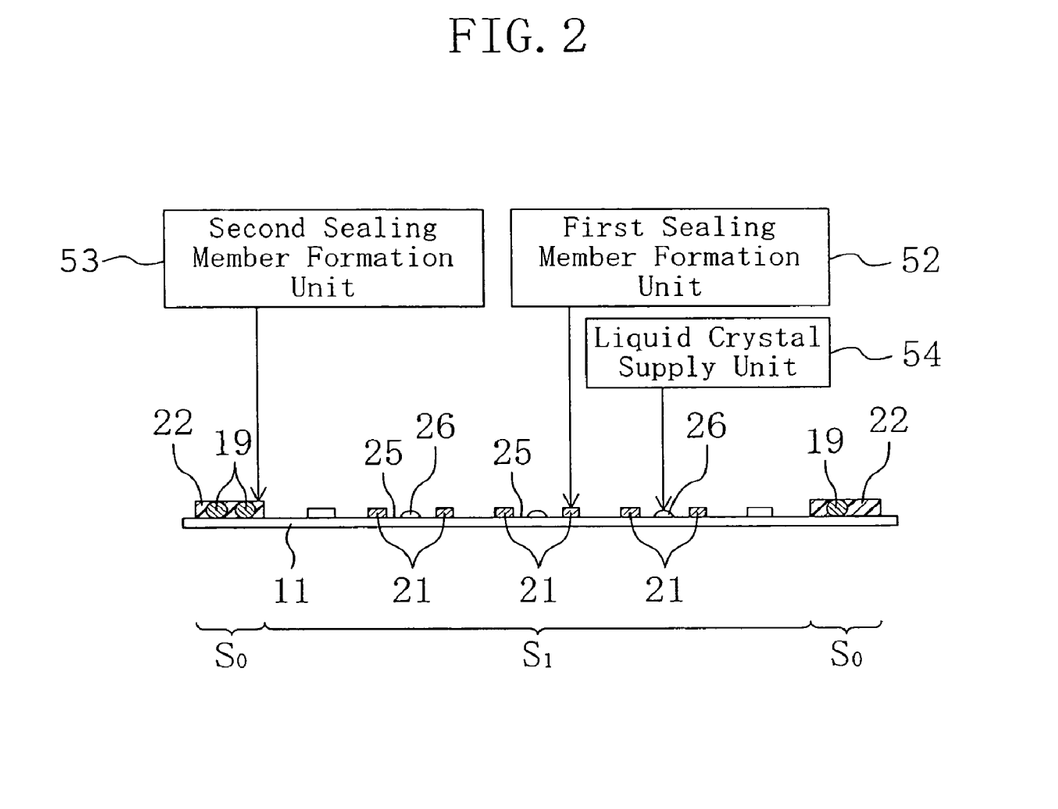
FIG. 2 is a cross-sectional view of a liquid crystal display device, which explains a first sealing member formation step, a second sealing member formation step, and a liquid crystal supplying step.

First, in the first sealing member formation step, a plurality of liquid crystal cell formation regions $S_1$ in each of which a plurality of liquid crystal cells 12 are formed are set at predetermined intervals on the lower one of the pair of substrate base materials 11 (for example, a TFT substrate). In addition, as shown in FIG. 2, a plurality of first sealing members 21 of closed configuration are formed in each liquid crystal cell formation region $S_1$ by the first sealing member formation unit 52. First sealing members 21 are formed by applying a material of the first sealing member to the substrate base material 11 to surround the respective display areas of a liquid crystal display device. A UV/heat cure seal material for a one-drop-fill process, No. 780 (made by Kyoritsu Chemical & Co., Ltd), is used for the first sealing member 21. A 5-μm-diameter glass spacer is mixed into the first sealing member 21.

The pair of substrate base materials 11 each have, for example, a width of 400 mm and a length of 1600 mm. The pair of substrate base materials 11 may be formed in a roll outside the vacuum container 15.

Next, in the second sealing member formation step, as shown in FIG. 2, second sealing members 22 are formed outside the liquid crystal cell formation region $S_1$ (i.e., in marginal regions $S_0$) by the second sealing member formation unit 53. The second sealing members 22 are sandwiched between the pair of substrate base materials 11 in a later process step. The seal material, i.e., No. 780 (made by Kyoritsu Chemical & Co., Ltd), is used, like the first sealing members 21, for the second sealing members 22. 50-μm-diameter glass spacers 19 are mixed into the second sealing members 22. The first and second sealing member formation units 52 and 53 are configured to apply the material of the first and second sealing members 21 and 22 in predetermined patterns to the top surface of the lower one of the pair of substrate base materials 11.

Subsequently, in the liquid crystal supplying step, as shown in FIG. 2, liquid crystal material 26 is supplied in drops, by the liquid crystal supply unit 54, into recesses 25 defined by the respective inner perimetrical surfaces of the first sealing members 21 and the top surface of the lower substrate base material 11. It is preferably supplied into the recesses 25 in every one of the liquid crystal cell formation regions $S_1$ that can be accommodated by the vacuum container 15 at once. The liquid crystal supply unit 54 is configured to discharge a predetermined amount of the liquid crystal material 26.

Figure 3:
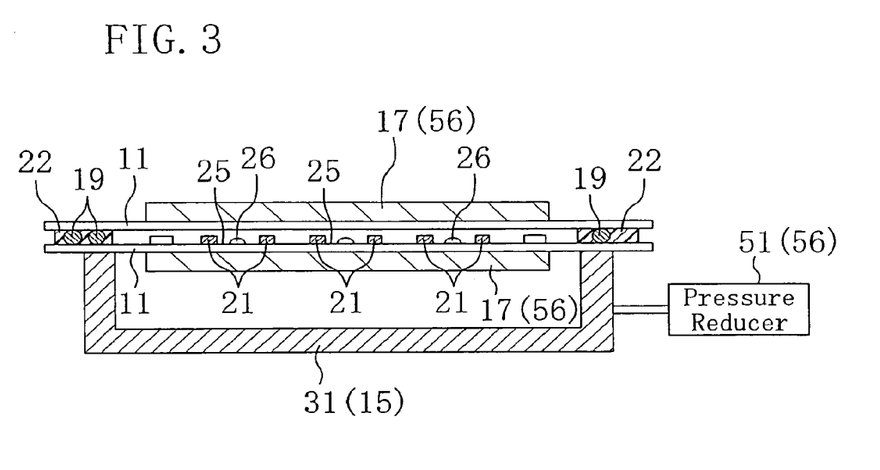
FIG. 3 is a cross-sectional view of part of a fabrication apparatus for a liquid crystal display device, which explains an alignment step.

Next, in the alignment step, as shown in FIG. 3, the lower substrate base material 11 on which the first sealing members 21 or other elements are formed are put on a lower chamber 31 and held thereon using a vacuum force. Furthermore, the upper substrate base material 11 is aligned with and overlaid on the lower substrate base material 11. In this case, the distance between the pair of substrate base materials 11 is reduced such that the second sealing members 22 make contact with both the pair of substrate base materials 11. In addition, holder plates 17 are placed immediately above the top surface of the upper substrate base material 11 and immediately below the bottom surface of the lower substrate base material 11, respectively.

Figure 4:
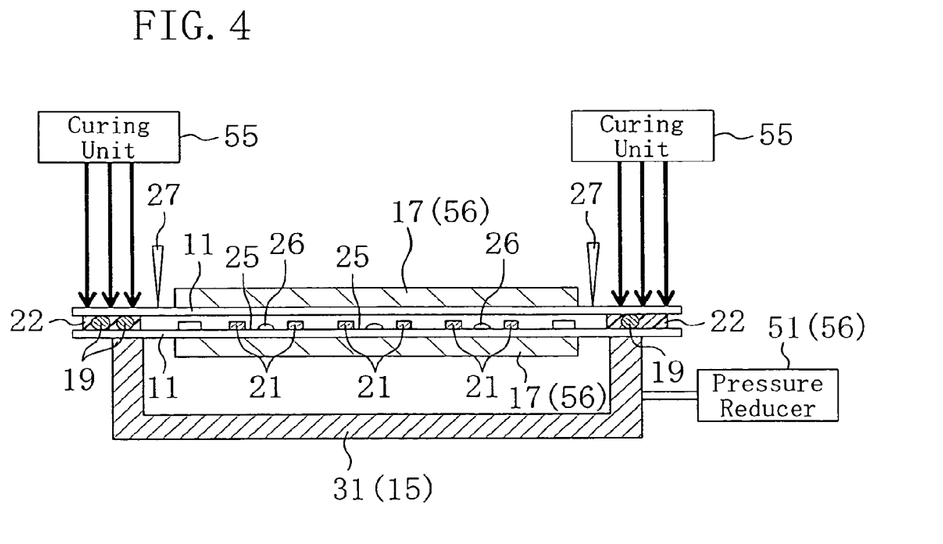
FIG. 4 is a cross-sectional view of part of the fabrication apparatus for a liquid crystal display device, which explains a curing step.

Thereafter, in the curing step, as shown by arrows in FIG. 4, the pair of substrate base materials 11 are brought into contact with each other by applying a pressure to the second sealing members 22. In addition, the second sealing members 22 are cured using the curing units 55 by applying ultraviolet light to the second sealing members 22, for example, at a dose of 2 J/cm$^2$. The curing units 55 are light sources for applying light, such as ultraviolet light, to an object.

In this embodiment, in order to prevent the first sealing members 21 from making contact with the upper substrate base material 11, the glass spacers 19 mixed into the second sealing members 22 each have a larger diameter than the glass spacers mixed into the first sealing members 21. However, the respective glass spacers of the first and second sealing members 21 and 22 may be set to each have the same diameter. More particularly, the pair of substrate base materials 11 may be bonded to each other by bringing the first and second sealing members 21 and 22 in contact with the upper substrate base material 11 at the same time.

The second sealing members 22 may be composed of a material that will be cured by applying electron beams thereto. Thus, instead of ultraviolet light, electron beams may be applied to the second sealing members 22.

Subsequently, the upper substrate base material 11 is cut between the marginal regions $S_0$ and the liquid crystal cell formation region $S_1$. As shown in FIG. 4, a wedge-like cutter 27 is used to cut the upper substrate base material 11.

More particularly, when the pair of substrate base materials 11 are bonded to each other, at least the upper substrate base material 11 (which is not fixed) need be depressed by physical deformation, because the distance between respective parts of the pair of substrate base materials 11 located outside the liquid crystal cell formation region $S_1$ is relatively large. Therefore, the cut of the upper substrate base material 11 in this embodiment can prevent stress concentration due to the deformation of the upper substrate base material 11 in the vicinity of the second sealing members 22. As a result, the thicknesses of the liquid crystal cells in the fabricated liquid crystal display device can be maintained with high accuracy.

When the respective glass spacers of the first and second sealing members 21 and 22 have the same diameter or when the pair of substrate base materials 11 or the second sealing members 22 are made of a material likely to become deformed, the upper substrate base material 11 need not be cut.

Figure 5:
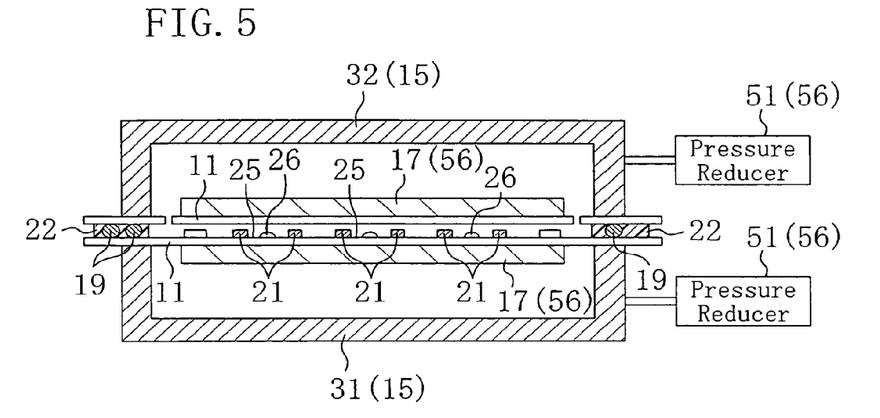
FIG. 5 is a cross-sectional view of the fabrication apparatus for a liquid crystal display device, which explains a containment step.

Next, in the containment step, as shown in FIG. 5, an upper chamber 32 is overlaid on the lower chamber 31 with the second sealing members 22 and the pair of substrate base materials 11 interposed therebetween. The lower chamber 31 and the upper chamber 32 constitute a vacuum container 15. In this way, the liquid crystal cell formation region $S_1$ is contained inside the vacuum container 15, and the inside of the vacuum container 15 is sealed with the second sealing members 22.

Figure 6:
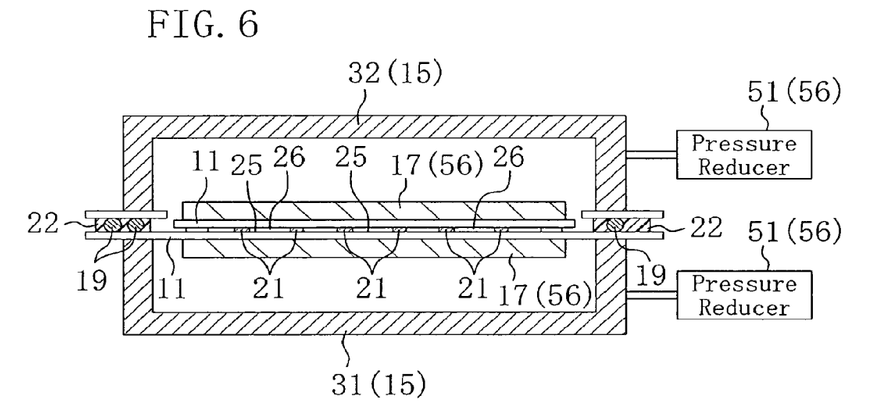
FIG. 6 is a cross-sectional view of the fabrication apparatus for a liquid crystal display device, which explains a bonding step.

Subsequently, in the bonding step, as shown in FIG. 6, the vacuum container 15 is reduced in pressure by the pressure reducers 51, such as vacuum pumps, so that air is exhausted from the space between the pair of substrate base materials 11 to produce a vacuum. In this way, the pair of substrate base materials 11 are bonded to each other. The bonding unit 56 for the pair of substrate base materials 11 is composed of the pressure reducers 51 and the holder plates 17. In this case, the pair of substrate base materials 11 are held by being sandwiched between the holder plates 17 serving as a pair.

In this embodiment, as shown in FIG. 1, openings are formed between respective parts of the pair of substrate base materials 11 corresponding to the liquid crystal cell formation region $S_1$ to extend along the longer edges of the liquid crystal cell formation region $S_1$. Therefore, the exhaust of air from these openings can produce a vacuum between the pair of substrate base materials 11.

If the inside of the vacuum container 15 has an atmospheric pressure of 1 Torr or less and the distance between the pair of substrate base materials 11 is made smaller, the pair of substrate base materials 11 can be bonded to each other with higher accuracy. More particularly, the vacuum container 15 is further reduced in pressure so that the distance between the pair of substrate base materials 11 is reduced to a predetermined value. In this state, a previously formed part of each first sealing member 21 through which the pair of substrate base materials 11 are temporarily bonded to each other is cured. Alternatively, the first sealing member 21 is entirely radiated with ultraviolet light so as to be cured to some extent. Thereafter, in order to further promote the curing of the first sealing member 21, the first sealing member 21 may be heated at 120° C. for 60 minutes. Since the pair of substrate base materials 11 are held by the holder plates 17, this can prevent the first sealing members 21 from partly coming off owing to the reduced pressure in the vacuum container 15 and also the upper substrate base material 11 from becoming deformed.

Thereafter, another liquid crystal cell formation region $S_1$ next to the liquid crystal cell formation region $S_1$ in which the liquid crystal cells 12 have been formed in the above-mentioned manner is fed into and contained inside the vacuum container 15, and liquid crystal cells 12 are formed in the same manner as described above. This is repeatedly carried out.

As a result, pressure reduction in the vacuum container 15 makes the distance between the pair of substrate base materials 11 smaller so that the pair of substrate base materials 10 are bonded to each other. Then, the inside of the cells 10 are filled with the liquid crystal material 26, and air bubbles are removed from the cells 10. Thereafter, liquid crystal display devices each having the liquid crystal cells 10 are separated from one another.

Effects of Embodiment 1

In view of the above, according to this embodiment, only respective parts of the pair of flexible substrate base materials 11 are contained in the vacuum container 15, and the liquid crystal cells 12 are formed inside the vacuum container 15. Therefore, even if the pair of substrate base materials 11 are entirely very large, air bubbles are removed from the liquid crystal cells 12 without using a large vacuum container, thereby fabricating liquid crystal display devices. In addition, respective parts of the pair of substrate base materials 11 are fed into and contained one pair of parts after another in the vacuum container 15, which enables spatially continuous fabrication of liquid crystal display devices. This can improve the product accuracy of the liquid crystal display devices while reducing the production cost.

Embodiment 2

Figure 7:
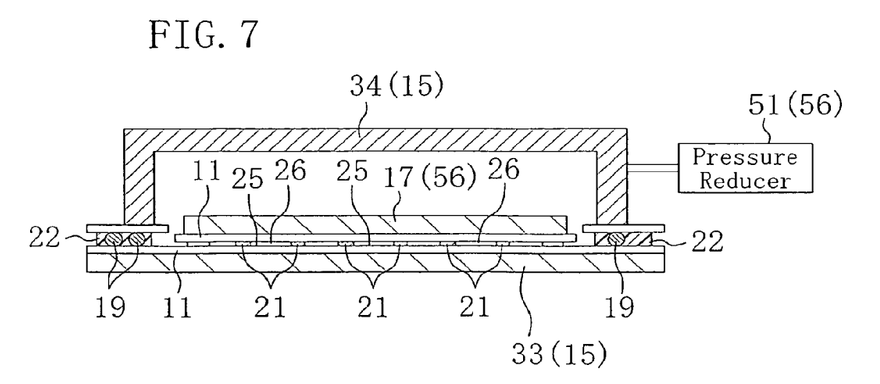
FIG. 7 is a cross-sectional view of a fabrication apparatus for a liquid crystal display device of a second embodiment, which explains a bonding step.

FIG. 7 is a cross-sectional view showing a second embodiment of a fabrication apparatus for a liquid crystal display device of the present invention. In the following embodiments, the same components as those in FIGS. 1 through 6 are denoted by the same reference numerals, and the description thereof is omitted here.

In the first embodiment, the vacuum container 15 is composed of the lower chamber 31 and the upper chamber 32. On the other hand, in this embodiment, a vacuum container 15 is composed of a stage 33 on which a pair of substrate base materials 11 are placed and a vacuum chamber 34 that covers the stage 33.

More particularly, in order to fabricate a liquid crystal display device, in an alignment step of this embodiment, unlike the first embodiment, the lower one of the pair of substrate base materials 11 formed with the first sealing members 21 is placed on the stage 33 and held by, for example, an electrostatic force. Thereafter, a bonding step is carried out as shown in FIG. 7. The other steps are the same as those of the first embodiment.

In view of the above, the vacuum container 15 can be made smaller. Therefore, an apparatus for fabricating a liquid crystal display device can be wholly reduced in size.

Embodiment 3

Figure 8:
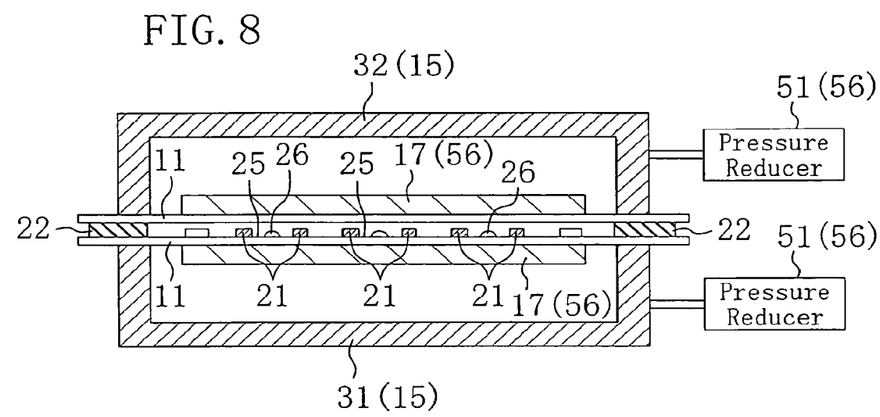
FIG. 8 is a cross-sectional view of a fabrication apparatus for a liquid crystal display device of a third embodiment, which explains an alignment step.
Figure 9:
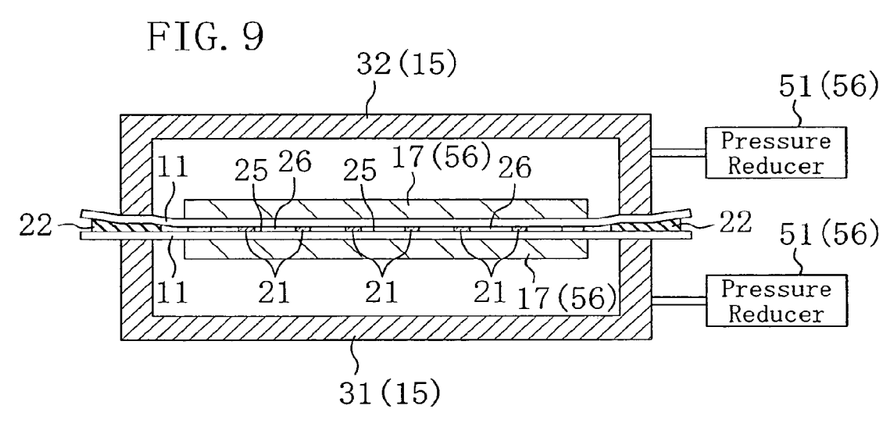
FIG. 9 is a cross-sectional view of the fabrication apparatus for a liquid crystal display device of the third embodiment, which explains a bonding step.

FIGS. 8 and 9 are cross-sectional views showing a third embodiment of a fabrication apparatus for a liquid crystal display device of the present invention.

In this embodiment, unlike the first embodiment, the second sealing members 22 are made of not an ultraviolet cure material but an elastic material. The second sealing members 22 are preferably made of, for example, rubber. Therefore, the second sealing members 22 are not bonded to the pair of substrate base materials 11.

In order to fabricate a liquid crystal display device, in the second sealing member formation step, second sealing members 22 made of a rubber material are formed in the marginal regions $S_0$. Since in this embodiment no glass spacer is mixed into the second sealing members 22, the second sealing members 22 are compressed and thus become elastically deformed by pressure reduction in the vacuum container 15 as shown in FIG. 9. In view of the above, since in this embodiment stresses are restrained from concentrating on the upper one of the substrate base materials 22, the step of cutting the upper substrate base material 11 can be omitted unlike the first embodiment. Therefore, a liquid crystal display device can be fabricated more easily.

Embodiment 4

Figure 10:
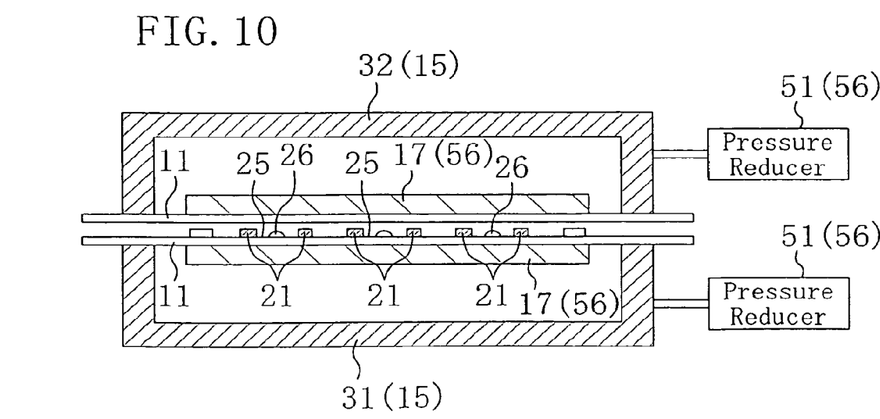
FIG. 10 is a cross sectional view of a fabrication apparatus for a liquid crystal display device of a fourth embodiment, which explains a containment step.
Figure 11:
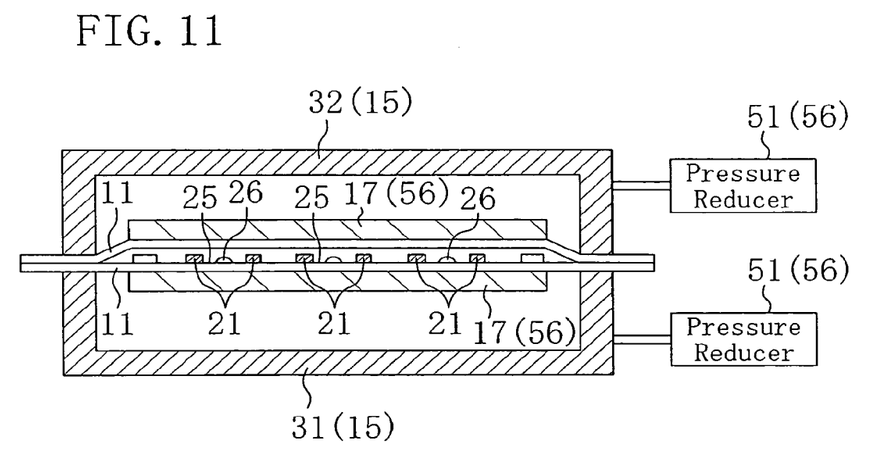
FIG. 11 is a cross-sectional view of the fabrication apparatus for a liquid crystal display device of the fourth embodiment, which explains an alignment step.
Figure 12:
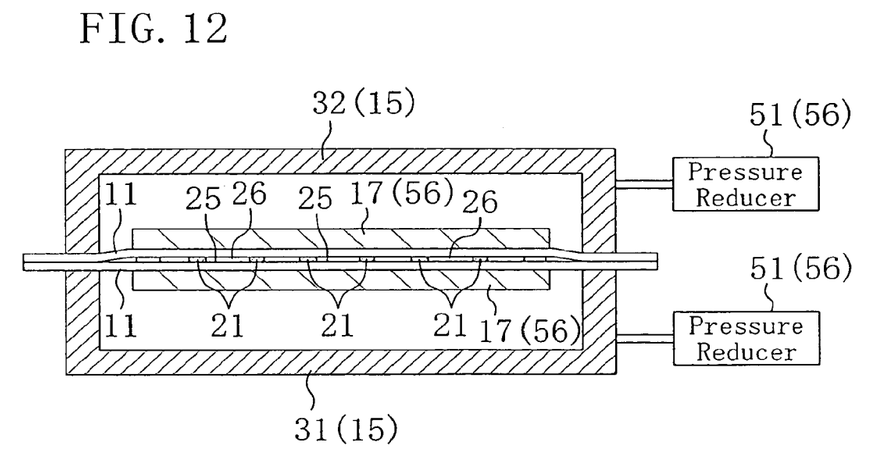
FIG. 12 is a cross-sectional view of the fabrication apparatus for a liquid crystal display device of the fourth embodiment, which explains a bonding step.

FIGS. 10 through 12 are cross-sectional views showing a fourth embodiment of a fabrication apparatus for a liquid crystal display device of the present invention. In this embodiment, a liquid crystal display device is fabricated without using second sealing members 22.

More particularly, in this embodiment, the second sealing member formation step is not carried out unlike the first embodiment. As shown in FIGS. 10 and 11, in the liquid crystal display device containment step, an upper chamber 32 is overlaid on a lower chamber 31 with only the pair of substrate base materials 11 interposed therebetween. In this way, the liquid crystal cell formation region $S_1$ is contained inside the vacuum container 15. Thereafter, in the bonding step, as shown in FIG. 12, the pair of substrate base materials 11 are bonded to each other by pressure reduction in the vacuum container 15.

In view of the above, according to this embodiment, a liquid crystal display device can be more easily formed.

Embodiment 5

FIGS. 13 through 19 show a fifth embodiment of a liquid crystal display device and a fabrication apparatus for the liquid crystal display device of the present invention. In the first embodiment, the liquid crystal material 26 is previously supplied into the recesses 25 located on the lower substrate base material 11 before the bonding of the pair of substrate base materials 11 to each other. On the other hand, in this embodiment, after a pair of substrate base materials 11 are bonded to each other, cells 10 are filled with liquid crystal material.

Figure 13:
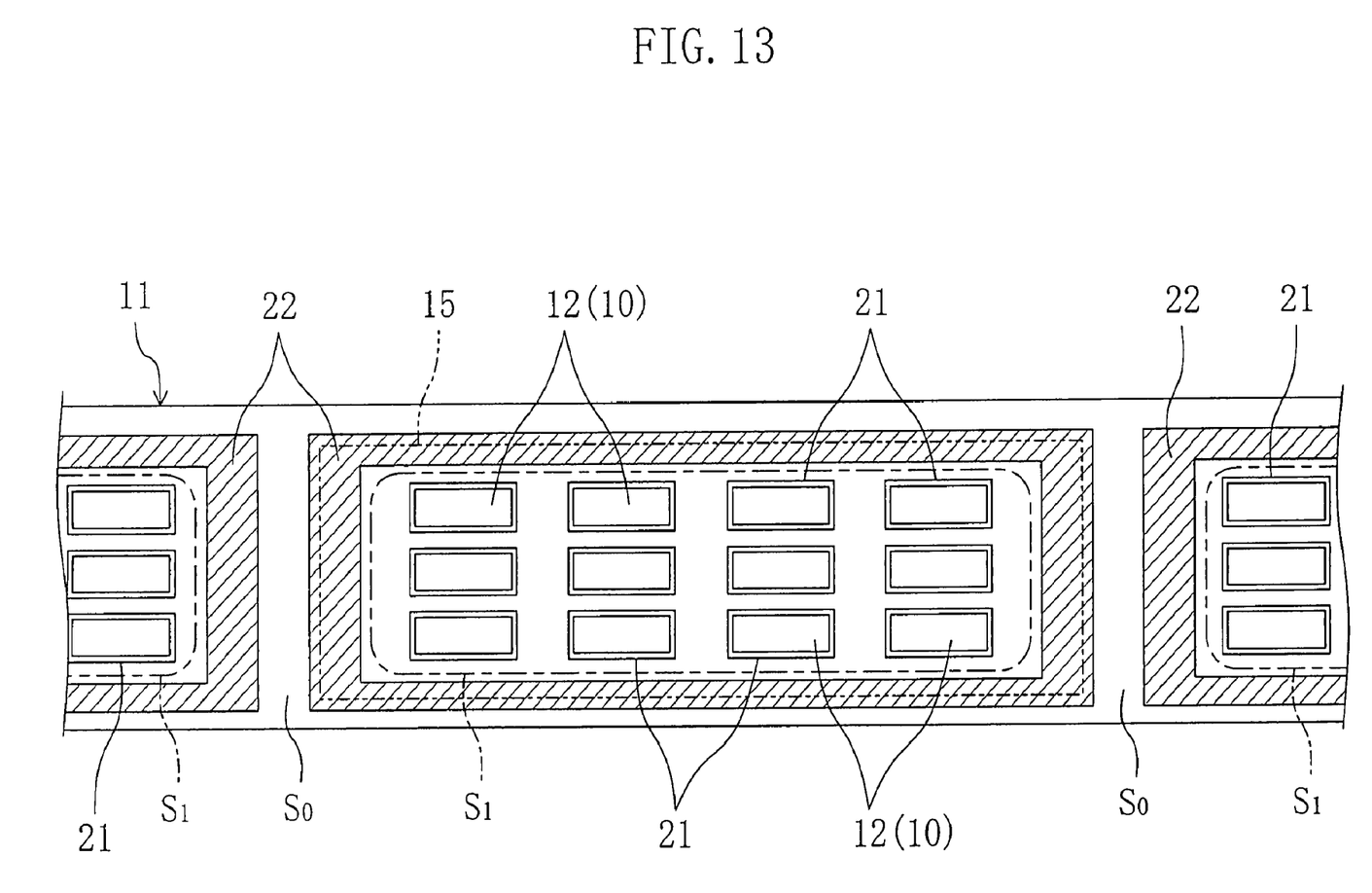
FIG. 13 is a plan view showing the lower one of a pair of substrate base materials of a fifth embodiment.

FIG. 13 is a plan view showing the lower one of the pair of substrate base materials 11 of the liquid crystal display device. A second sealing member 22 is formed to have a rectangular closed shape and surround the associated one of liquid crystal cell formations region $S_1$. In other words, the liquid crystal cell formation region $S_1$ is surrounded by a marginal region $S_0$.

—Fabrication Method for Liquid Crystal Display Device—

Next, a fabrication method for a liquid crystal display device of this embodiment will be described in detail. The fabrication method for a liquid crystal display device of this embodiment comprises a first sealing member formation step, a second sealing member formation step, an alignment step, a bonding step, a curing step, a containment step, and a liquid crystal filling step. A fabrication apparatus for a liquid crystal display device of this embodiment has a filler 57 for filling a plurality of cells with a crystal liquid material instead of the liquid crystal supply unit 54 of the first embodiment. The filler 57 is composed of, for example, a mechanism for discharging a predetermined amount of liquid crystal material and a pressure reducer 51.

Figure 14:
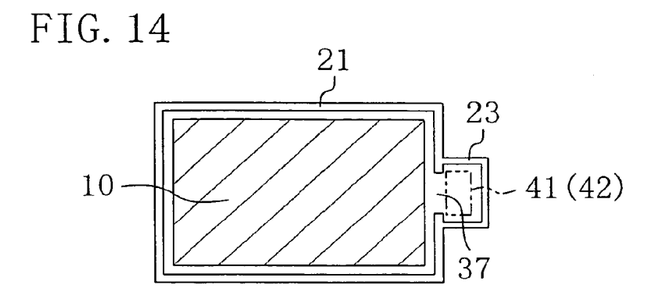
FIG. 14 is a plan view showing a cell having a fill opening.

In the first sealing member formation step, like the first embodiment, a plurality of first sealing members 21 are formed in each of liquid crystal cell formation regions $S_1$ of the lower one of a pair of substrate base materials 11. In this embodiment, as shown in FIG. 14, cells 10 defined by the first sealing members 21 and the pair of substrate base materials 11 have fill openings 37, respectively, through which they are filled with liquid crystal material. The fill openings 37 are enclosed from one side with third sealing members 23, respectively.

More particularly, the fill openings 37 are formed by removing parts of the first sealing members 21, and the third sealing members 23 are formed continuously with the first sealing members 21 to enclose the fill openings 37 from one side. The third sealing members 23 are formed to each have a U shape when seen from the above.

Next, the second sealing member formation step is carried out like the first embodiment. In this relation, glass spacers to be mixed into the second sealing member 22 each have the same diameter as those to be mixed into the first sealing member 21, i.e., a diameter of 5 μm. The first and second sealing members 21 and 22 may be made of the same material or different materials. In this embodiment, a heat cure seal material, No. 780P (made by Kyoritsu Chemical & Co., Ltd), is used for both the first and second sealing members 21 and 22. Otherwise, a UV cure seal material or a UV/heat cure seal material can be used for the first and second sealing members 21 and 22.

Figure 15:
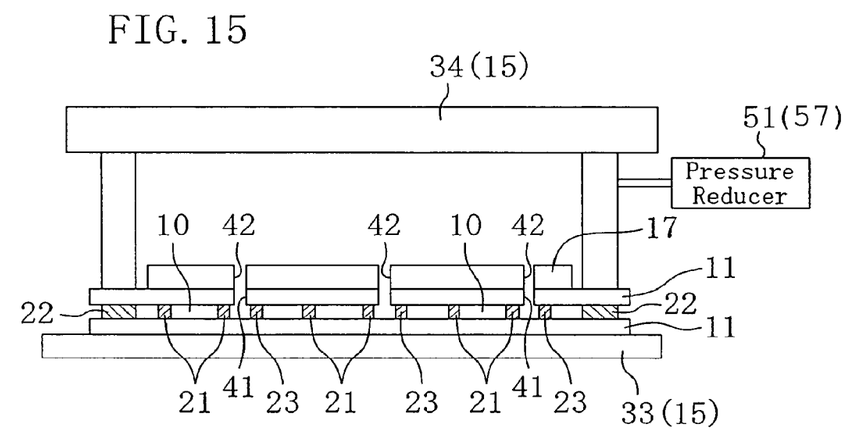
FIG. 15 is a cross-sectional view of a fabrication apparatus for a liquid crystal display device of the fifth embodiment, which explains a process from a containment step to a bonding step.

Thereafter, the pair of substrate base materials 11 placed on a stage 33 are aligned with each other, and one of them is overlaid on another with the first and second sealing members 21 and 22 interposed therebetween. The first and second sealing members 21 and 22 are cured by heat. When the first and second sealing members 21 and 22 are made of a UV cure seal material, they are cured by ultraviolet light. When they are made of a UV/heat cure seal material, they are cured by ultraviolet light or heat. Then, the containment step is carried out. In other words, as shown in FIG. 15, a vacuum chamber 34 is placed on the stage 33 with the pair of substrate base materials 11 and the second sealing member 22 interposed therebetween. In this way, one of liquid crystal cell formation regions $S_1$ of the lower substrate base material 11 is contained inside a vacuum container 15.

In this relation, through holes 41 are formed in the upper substrate base material 11 (which is not fixed) and above the U-shaped third sealing members 23 to extend vertically. Furthermore, communication holes 42 are formed in the holder plate 17 continuously with the through holes 41. This allows the inside of the vacuum container 15 to communicate with the inside of the cells 10.

Subsequently, as shown in FIG. 15, the vacuum container 15 is reduced in pressure. In this way, air is exhausted from the cells 10, which have been formed by bonding the pair of substrate base materials to each other using the first sealing members 21, through the through holes 41 and the communication holes 42, thereby producing a vacuum in each cell 10.

Figure 16:
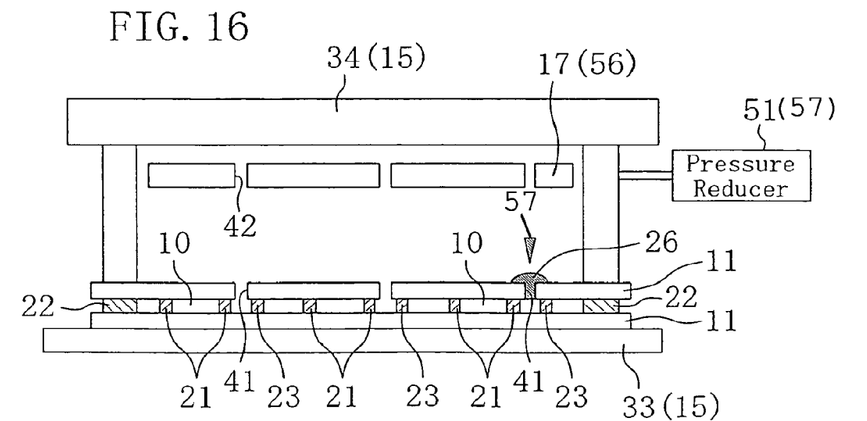
FIG. 16 is a cross-sectional view of the fabrication apparatus for a liquid crystal display device of the fifth embodiment, which explains a filling step.
Figure 17:
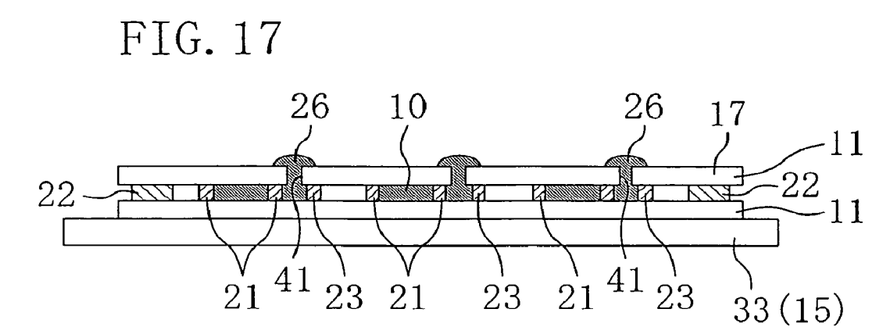
FIG. 17 is a cross-sectional view of a liquid crystal display device of the fifth embodiment, which explains the filling step.
Figure 18:
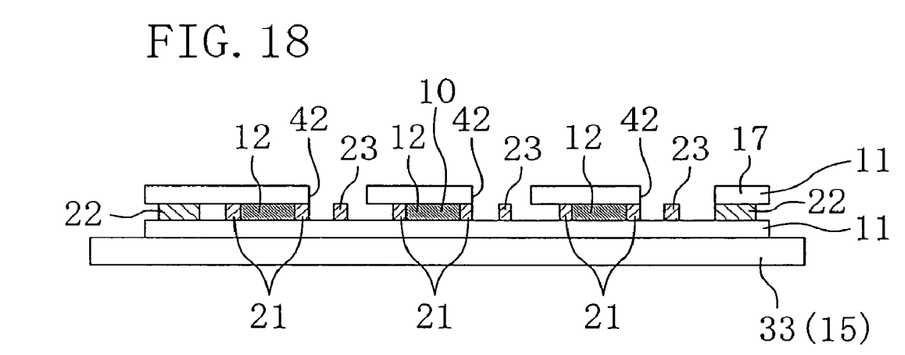
FIG. 18 is a cross-sectional view of the liquid crystal display device of the fifth embodiment, which explains the filling step.
Figure 19:
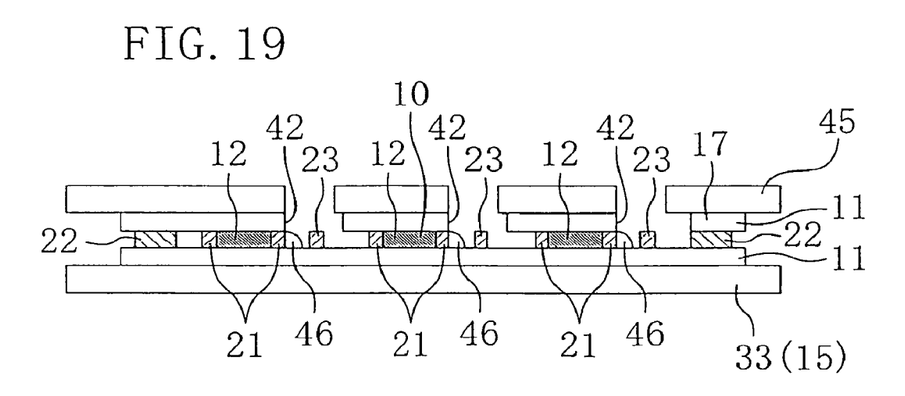
FIG. 19 is a cross-sectional view of the liquid crystal display device of the fifth embodiment, which explains the filling step.

Next, in the filling step, first, as shown in FIG. 16, the holder plate 17 is lifted while the vacuum container 15 is reduced in pressure, and liquid crystal material 26 is dropped into the through holes 41 of the upper substrate base material 11. Subsequently, as shown in FIG. 17, the vacuum container 15 is increased in pressure so as to be returned to normal atmospheric pressure. This allows the liquid crystal material 26 to penetrate the inside of the cells 10 through the through holes 41 and the fill openings 37. Thereafter, as shown in FIG. 18, excess part of the liquid crystal material 26 that lies off the respective edges of the cells 10 is wiped off so as to be removed. In addition, unnecessary parts of the upper substrate base material 11 located above the third sealing members 23 are removed. Next, as shown in FIG. 19, the respective fill openings 37 of the cells 10 are blocked by blocking members 46 with a pressure applied to the upper substrate base material 11 by pressure plates 45. In the above-mentioned manner, the cells 10 are filled with the liquid crystal material 26, thereby forming liquid crystal cells 12.

Thereafter, like the first embodiment, the liquid crystal cells 12 are separated from one another, thereby fabricating a plurality of liquid crystal display devices.

In view of the above, also according to this embodiment, the pair of substrate base materials 11 are partly contained inside the vacuum container 15, and the cells 10 are filled with the liquid crystal material 26 inside the vacuum container 15. Therefore, air bubbles can be sufficiently removed from the liquid crystal cells 12.

Furthermore, the fill openings of the cells 10 are enclosed from one side with the third sealing members 23, respectively. This can prevent excess part of the liquid crystal material 26 from leaking out when the cells 10 are filled with the liquid crystal material 26.

Although in this embodiment the stage 33 serves as a holder plate, the pair of substrate base materials 11 may be held by a pair of holder plates 17 while being sandwiched therebetween as described in the first embodiment and other embodiments.

Embodiment 6

Figure 20:
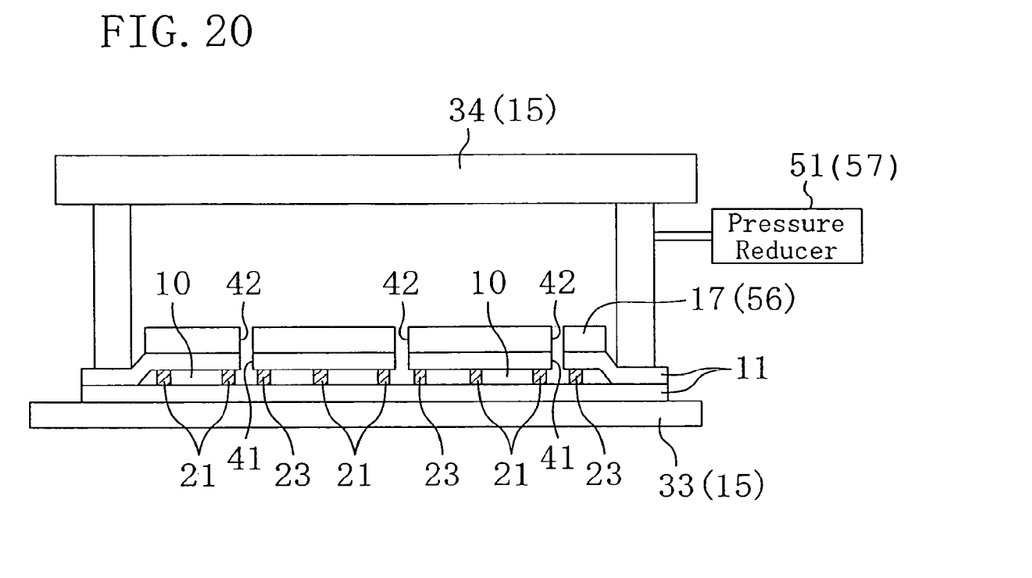
FIG. 20 is a cross-sectional view of a fabrication apparatus for a liquid crystal display device of a sixth embodiment, which explains a bonding step.

FIG. 20 is a cross-sectional view showing a sixth embodiment of a fabrication apparatus for a liquid crystal display device of the present invention.

A liquid crystal display device of this embodiment is fabricated like the fifth embodiment with the exception that the second sealing member 22 is not formed.

More particularly, in this embodiment, unlike the fifth embodiment, the second sealing member formation step is not carried out. In the containment step, a pair of substrate base materials 11 are partly contained inside a vacuum container 15, and then, as shown in FIG. 20, the vacuum container 15 is reduced in pressure. In this way, air is exhausted from the inside of the cells 10 previously formed by bonding the pair of substrate base materials 11 to each other using first sealing members 21 through the through holes 41 and the communication holes 42, thereby producing a vacuum. In this case, the pair of substrate base materials 11 come into direct contact with each other in a marginal region $S_0$.

In view of the above, since in this embodiment second sealing members 22 are not formed, a liquid crystal display device can be fabricated with ease.

Embodiment 7

Figure 21:
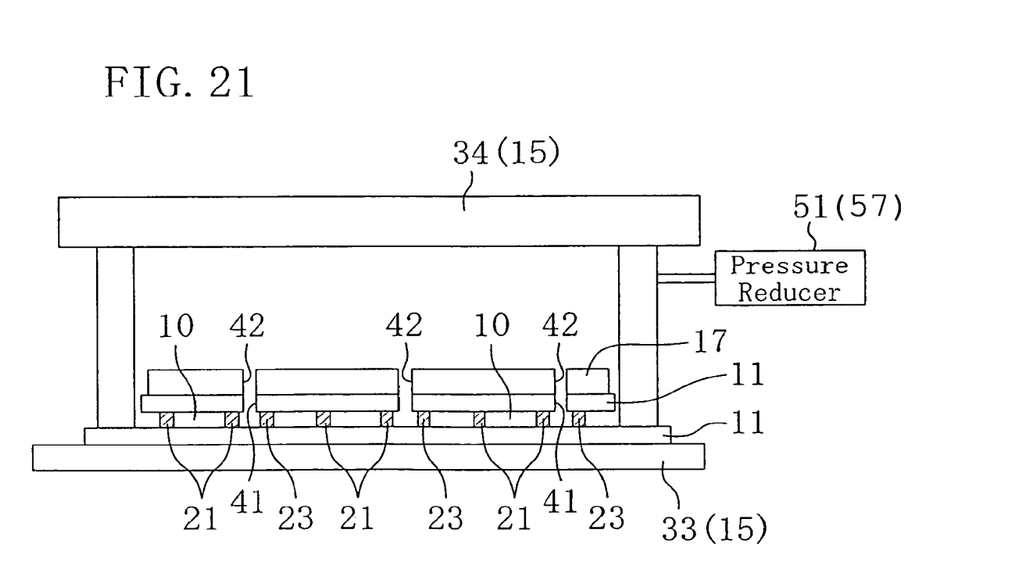
FIG. 21 is a cross-sectional view of a fabrication apparatus for a liquid crystal display device of a seventh embodiment, which explains a bonding step.

FIG. 21 is a cross-sectional view showing a seventh embodiment of a fabrication apparatus for a liquid crystal display device of the present invention.

In this embodiment, unlike the sixth embodiment, the upper one of a pair of substrate base materials 11 (which is not fixed) previously bonded to each other using first sealing members 21 is partly removed in the marginal region $S_0$.

More particularly, the upper substrate base material 11 is partly removed, and then the containment step is carried out. In the containment step, a vacuum chamber 34 is overlaid on a stage 33 with the lower one of the pair of substrate base materials 11 interposed therebetween. In the above-mentioned manner, one of liquid crystal cell formation regions $S_1$ of the lower substrate base material 11 is contained inside the vacuum container 15.

In view of the above, also according to this embodiment, a liquid crystal display device can be fabricated with ease. Furthermore, the end of a region of the upper substrate base material 11 located in the vacuum chamber 34 is not elastically deformed, because it is not pressed by the vacuum chamber 34. Therefore, the thickness of each of formed liquid crystal cells 12 (cell gap) can be controlled with high accuracy.

As described above, the fabrication method and apparatus for a flexible liquid crystal display device and the substrate base material for the same of the present invention are useful and suitable, in particular, when a liquid crystal display device can be fabricated spatially continuously without using a large vacuum container and air bubbles are to be removed from the liquid crystal cells with reliability.

What is claimed is:

1. An apparatus for fabricating a liquid crystal display device in which a plurality of liquid crystal cells are formed by encapsulating liquid crystal material within a plurality of first sealing members, respectively, between a pair of flexible substrate base materials and then separated from one another, said apparatus comprising:
   a vacuum container; and
   a pressure reducer arranged to reduce the pressure in the vacuum container; wherein
   the vacuum container is arranged to contain only a portion of a first one of the pair of flexible substrate base materials and a portion of a second one of the pair of flexible substrate base materials, the portion of the first one of the pair of flexible substrate base materials being directly opposed to the portion of the second one of the pair of flexible substrate base materials, such that the vacuum container does not contain other portions of the pair of flexible substrate base materials, the vacuum container including a pair of holder plates arranged to sandwich and hold only the portion of the first one of the pair of flexible substrate base materials and the portion of the second one of the pair of flexible substrate base materials because of the pressure reducer that reduces the pressure in the vacuum container; and
   the plurality of liquid crystal cells are formed inside the vacuum container while being reduced in pressure by the pressure reducer.

2. The apparatus of claim 1, further comprising:
   a first sealing member formation unit arranged to set, on one of the pair of flexible substrate base materials, a plurality of liquid crystal cell formation regions in which the plurality of liquid crystal cells are arranged at predetermined intervals and arranged to form the plurality of first sealing members in each of the plurality of liquid crystal cell formation regions, each said first sealing member being of closed configuration;
   a liquid crystal supply unit arranged to supply the liquid crystal material into recesses defined by the respective inner perimetrical surfaces of the plurality of first sealing members and the adjacent surface of the one of the pair of flexible substrate base materials; and a bonding unit arranged to bond the pair of flexible substrate base materials to each other by reducing pressure in the vacuum container.

3. The apparatus of claim 2, wherein
the vacuum container includes a stage on which the pair of flexible substrate base materials are placed and a vacuum chamber that covers the stage.

4. The apparatus of claim 1, further comprising:
a first sealing member formation unit arranged to set, on one of the pair of flexible substrate base materials, a plurality of liquid crystal cell formation regions in which the plurality of liquid crystal cells are arranged at predetermined intervals and arranged to form the plurality of first sealing members in each of the plurality of liquid crystal cell formation regions;
a bonding unit arranged to bond the pair of flexible substrate base materials to each other by reducing pressure in the vacuum container; and
a filler arranged to fill, with liquid crystal material, a plurality of cells defined by the pair of flexible substrate base materials and the plurality of first sealing members, said pair of flexible substrate base materials being bonded to each other inside the vacuum container.

5. The apparatus of claim 4, wherein
the vacuum container includes a stage on which the pair of flexible substrate base materials are placed and a vacuum chamber that covers the stage.

6. The apparatus of claim 4, wherein
each of the plurality of cells has a fill opening through which the plurality of cells are filled with liquid crystal material, and
each said fill opening is enclosed from one side with a third sealing member.

7. The apparatus of claim 4, further comprising
a pair of holder plates arranged to hold the pair of flexible substrate base materials by reducing pressure in the vacuum container; wherein
communication holes are defined in one of the pair of holder plates to allow the plurality of cells to communicate with the vacuum container, and the plurality of cells are filled with liquid crystal material through the communication holes.

* * * * *